Feb. 15, 1944.    R. ANSCHÜTZ    2,341,588
TOTALIZER
Original Filed Nov. 19, 1936    4 Sheets-Sheet 1
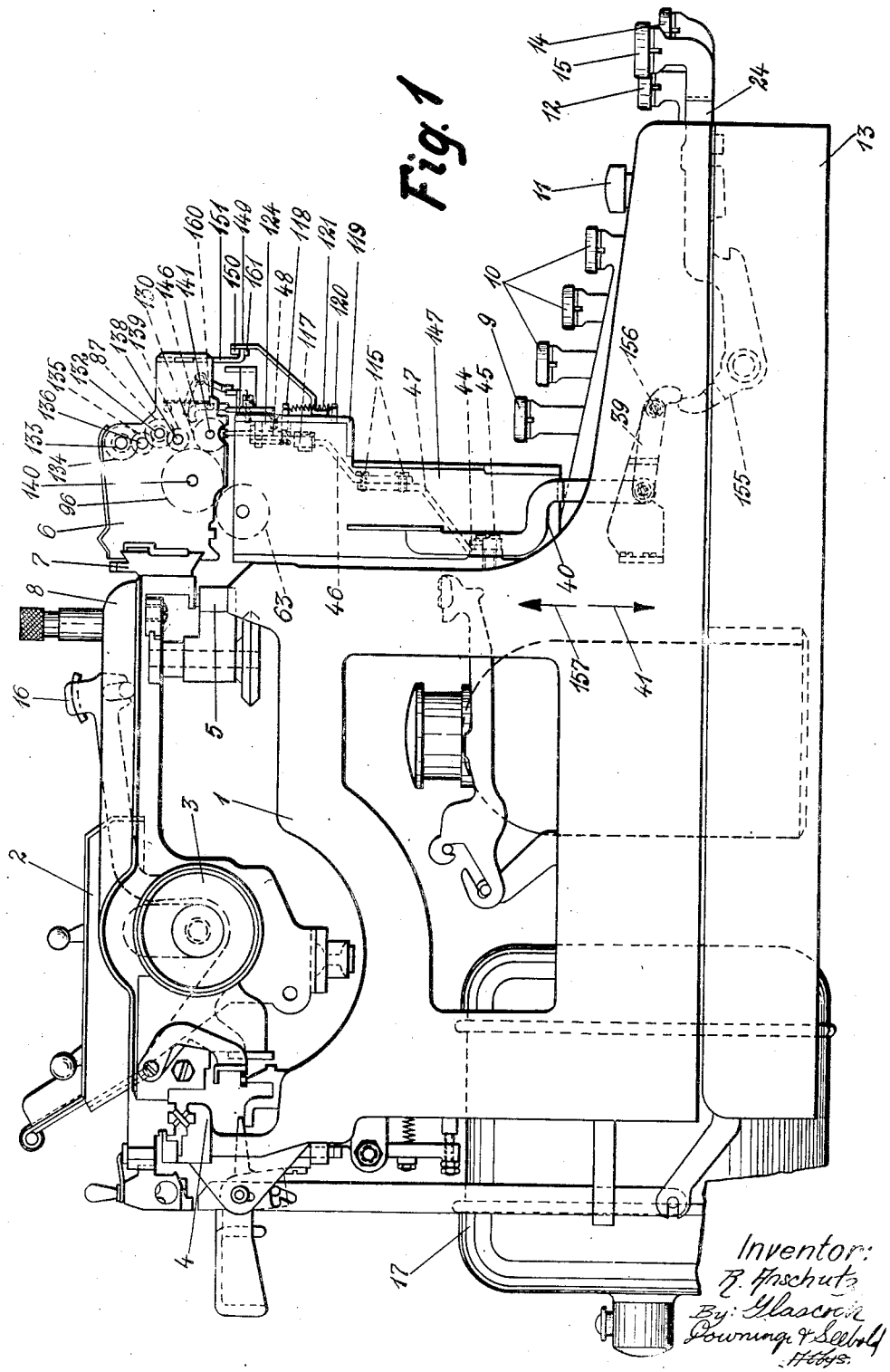

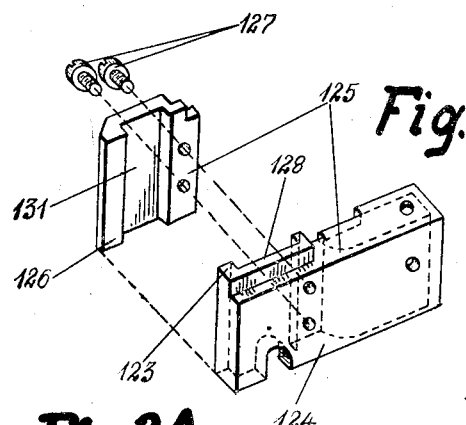
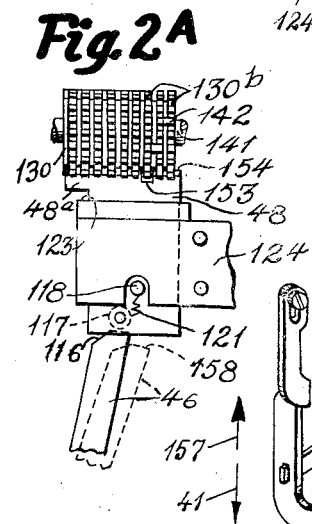
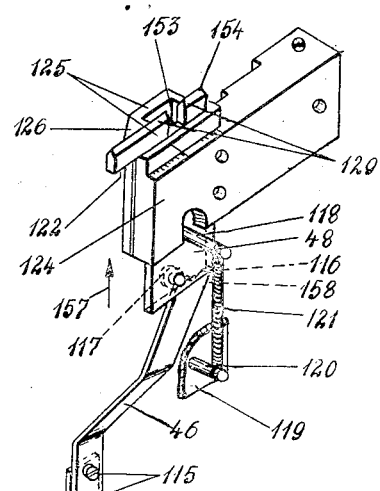
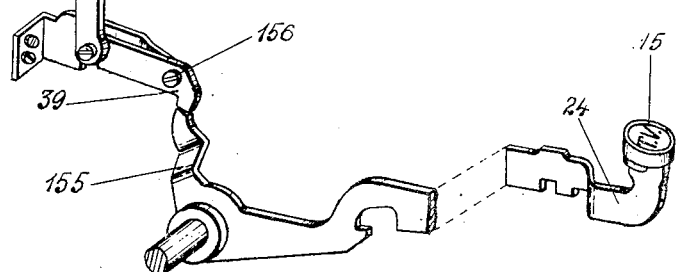

Feb. 15, 1944.	R. ANSCHÜTZ	2,341,588
TOTALIZER
Original Filed Nov. 19, 1936	4 Sheets-Sheet 3

Inventor:
R. Anschütz
By: Glascock Downing & Seebold
Attys.

Feb. 15, 1944. R. ANSCHÜTZ 2,341,588
TOTALIZER
Original Filed Nov. 19, 1936  4 Sheets-Sheet 4

Inventor:
R. Anschütz
by Glascock Downing & Seibold
Attys.

Patented Feb. 15, 1944

2,341,588

UNITED STATES PATENT OFFICE 2,341,588

TOTALIZER

Robert Anschütz, Zella-Mehlis, Germany; vested in the Alien Property Custodian

Continuation of application Serial No. 111,726, November 19, 1936. This application October 30, 1940, Serial No. 363,566. In Germany November 25, 1935

7 Claims. (Cl. 235—59)

This application is a continuation of my application Ser. No. 111,726, filed November 19, 1936, and relates to a totalizer, more particularly for typewriter calculating machines.

Various forms of such totalizers are already known as, for instance, those disclosed in patents to Bricken, No. 1,266,660, issued May 21, 1918, and to Wahl No. 1,270,471, issued June 25, 1918.

For instance, it has been proposed to use the usual tens transmitting gear as a stop for the "zero-setting" or "zero-shifting" operation by locking the driving wheel of the totalizer which is located in the next higher place or denomination of the totalizer with respect to the numeral wheel which is to be set or brought to zero. The numeral wheel which is to be brought to zero in this case is limited in its rotation by the tens shift cam which acts on the next higher place. In view of the fact that the tens shift cams are relatively small and have a form which is not suitable for the relatively heavy stresses occurring in the total taking, it has been further proposed to provide a specially formed zero-stop. Although the shape of the zero-stop could thus be better adapted to the requirements, it was not possible to make the zero-stop very strong and durable or to arrange the counter-stop in a convenient manner, as the zero-stop was mounted on a toothed wheel which was located between the main driving wheel and the numeral wheel.

These disadvantages are eliminated according to the invention, by the provision of an additional group or alined series of toothed wheels which is connected, preferably in parallel arrangement, with the train of toothed wheels which is arranged between the main driving wheel and the numeral wheel.

This offers the advantage that the zero-stops on the wheels of this group of toothed wheels can be made very strong and sufficiently wide, and the wheels of this group of wheels can be so mounted that they co-act with the counter-stop in a suitable manner.

Furthermore, this arrangement offers the advantage that the wheels of the additional group of wheels may be adapted for carrying the teeth for the known clear sign feeling member at the same time. The small extension or projection of the totalizer casing which is necessary in order to accommodate the additional group of wheels is advantageously enlarged so as to render it possible to utilize the same for supporting and enclosing the clear sign feeling member and the control cam for adjusting the type of calculating and writing.

In the drawings, one form of construction of the invention is illustrated by way of example.

Fig. 1 shows a left-hand side elevation of a typewriter calculating machine, provided with the novel device according to the invention.

Fig. 2 shows a fragmentary perspective view, viewed from the left-hand front side of the machine, of the device according to the invention, including the mechanism for the drive.

Fig. 2A is an enlarged detail view in front elevation illustrating a means to retain the zero-arresting member for the totalizer wheels effective.

Fig. 3 shows, in a perspective view, viewed from the left-hand front side of the machine, the supporting member for the zero-setting and aligning tooth, the parts being separated from each other for the sake of better illustration.

General description

Figure 4:
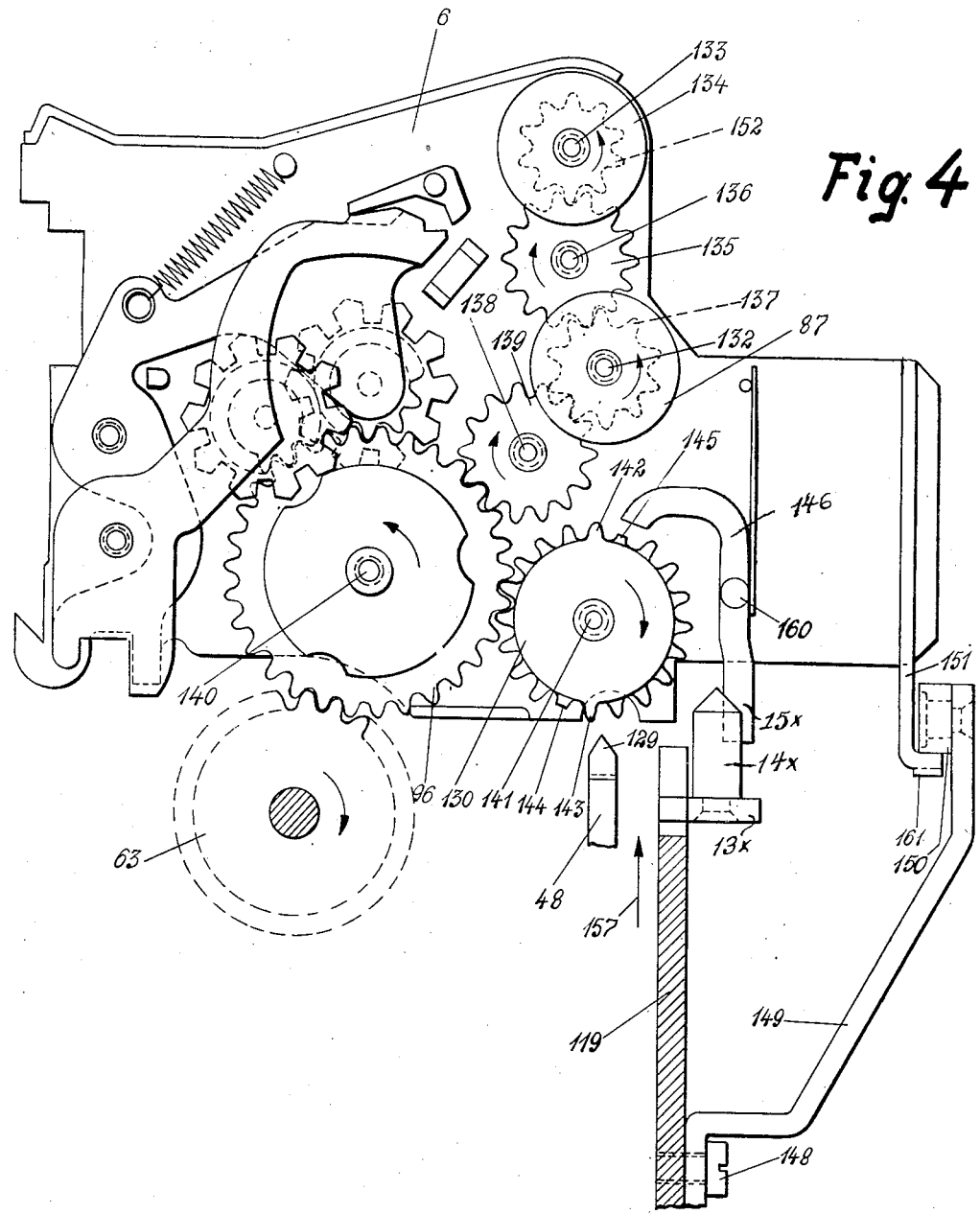
Fig. 4 represents a side elevation of a totalizer, the left-hand side wall being removed in order to show the gear system of the totalizer.

On the machine frame 1 (Figure 1) the carriage 2 with its platen 3 is displaceably mounted on the running rails 4 and 5. The column totalizers 6 (Figure 1) are mounted so as to be readily attachable and detachable on a rail 7 fixed to the carriage frame 8. The carriage 2 is continuously acted on by a spring-operated draw band (not shown) from right to left. By means of an escapement mechanism described in the Patent No. 2,046,524, the carriage 2 is moved on each key-stroke towards the left one step at a time.

On the front side of the machine, a row of number-keys 9 (Figure 1) is arranged. By means of these number keys 9, values are typed upon the platen 3, but not inserted into the totalizers 6. The character keys 10, which are arranged underneath the number keys 9 in the keyboard, serve for the writing of clear text. The space key 11 is located in front of the character keys 10. By means of this space key 11, when depressed, the paper carriage 2 may be selectively moved one or more steps to the left.

Underneath the usual keyboard, the tabulator keys 12 (Figure 1) are arranged in the supporting frame 13. If one of the tabulating keys 12 is depressed, in a manner described in detail in Patent 2,046,524, the carriage is released and travels to the left to bring that totalizer wheel train of the adjacent right hand column totalizer, which corresponds with the denomination of the depressed tabulating key, into mesh with the master wheel. Underneath the tabulator keys 12, the calculating keys 14 are arranged in the supporting frame 13, by depression of which keys, the transmission of corresponding values into the totalizers 6, is initiated, and the corresponding values are simultaneously typed upon the platen 3.

Besides the calculating keys 14, and the tabulator keys 12, a key 15 (Figures 1 and 2) provided with the indication "TV" is arranged on the left hand side in the supporting frame 13. This key 15 serves for total taking from the column totalizers 6.

On the right hand side of the paper carriage 2, a carriage release lever 16 (Figure 1) is arranged. By depression of this release key 16, the carriage 2 is released, as described in the Patent No. 2,046,524.

On the right hand side of the machine 1 the motor 17 (Figure 1) is arranged.

*General description of the details of the mechanism disclosing the invention*

The member 46 which is shown in Figs. 1 and 2 constitutes an extension of the arm 47 of the three-armed adjusting lever 44, which arm 47 is offset and extends upwardly, as shown in Figs. 1 and 2, and fixed thereto by means of screws 115. The upwardly extending end of the extension member 46, by means of its inclined face 116 (Fig. 2), is adapted to act upon a roller 117 mounted on a zero-setting and aligning tooth 48, in the manner which will be described under the heading "Operation of the device according to the invention." The roller 117 is rotatably mounted in any suitable manner on the zero-setting and aligning tooth or arresting member 48 which forms a part of the invention. The zero-setting and aligning tooth or arresting member 48 is held in its normal position by the spring 121, attached to a pin 118 projecting from the zero-setting and aligning tooth 48, the opposite end of the spring being anchored by the stud 120 which is fixedly mounted on the front wall 119 of the calculating mechanism (Figs. 1 and 2). This normal position of the spring 121 and zero-setting and aligning tooth 48 is determined by the contact of the lower edge 122 (Fig. 2) of the zero-setting and aligning tooth 48 with the upper face 123 (Fig. 3) of the flanged portion 124 of the guiding member 125 in which the zero-setting and aligning tooth 48 is vertically slidable. The guiding member 125 consists of two parts 124 and 126, the part 124 being fixed to the front wall 119 (Fig. 1) of the calculating mechanism in any suitable manner as by screws (not shown), while the part 126 is fixed to the part 124 as by screws 127 (Fig. 3). The zero setting and aligning tooth 48 which is guided in the way 128 of the part 124 of the guiding member 125 and held therein by the part 126 of the guiding member 125, is capable of co-acting by its tooth or edge 129 with the left intermediate wheels 130 (Figs. 1, 4 and 5) of the totalizer 6 to arrest the totalizer wheels in their zero positions. The part 126 of the guiding member 125 is provided with a clearance recess 131 in such manner that the aligning tooth 48, after removal of the spring-operated pin 118, can be lifted out in upward direction, notwithstanding the fact that the roller 117 projects from the aligning tooth 48.

Figure 5:
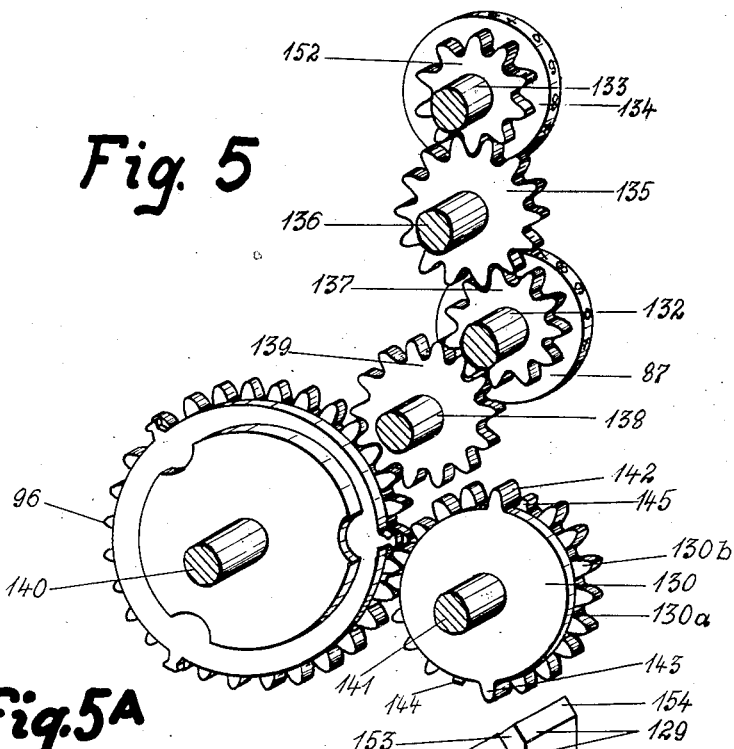
Fig. 5 shows, in a perspective view, the left-hand group of wheels of the totalizer.
Figure 5A:
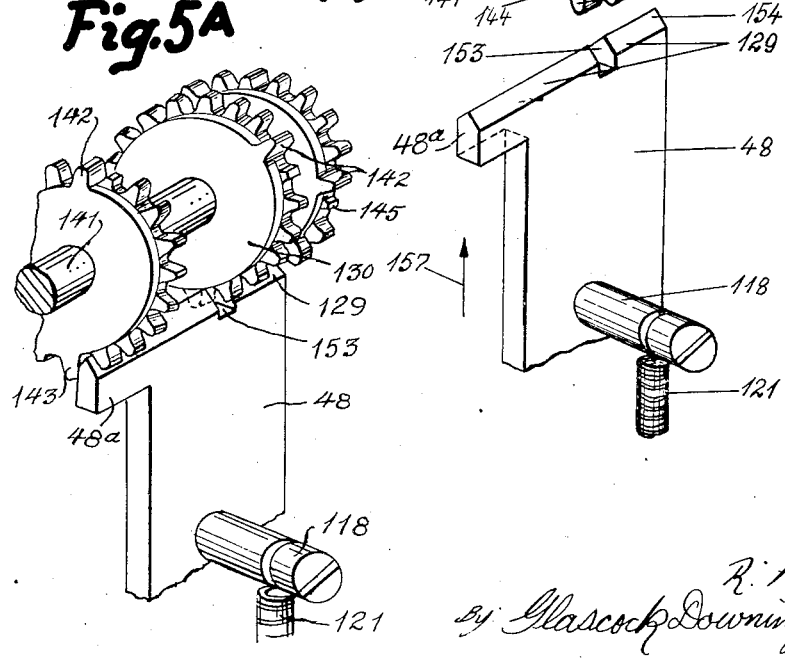
Fig. 5A is a detail perspective showing the co-action between the zero-arresting member and the totalizer wheels.

Rotatably mounted on two shafts 132 and 133 (Figs. 1, 4 and 5) which are supported in the two side walls of the totalizer 6 are two series of numeral wheels 134 and 87, respectively, with their gears 152 and 137 which are rigidly connected with the numeral wheels 134 and 87, respectively, and the comma disks (not shown). The numeral wheels 134 and 87 engage with the transmitting gears 135 which are rotatably mounted on a shaft 136 which, in turn, is rigidly supported in the two side walls. Furthermore the toothed gears 137 which are rigidly connected with the numeral wheels 87 mesh with intermediate gears 139 which are rotatably mounted on a shaft 138 supported in the two side walls of the totalizer 6. The gears 139 in turn mesh with driving gears 96 which are rotatably mounted on the shaft 140, rigidly supported in the two side walls of the totalizer 6. Rotatably mounted on a further shaft 141 which is supported in the two side walls, are the utility gears 130 which likewise mesh with the driving wheels 96. The utility gears 130 shown in Fig. 5, are each provided at diametrically opposite points with teeth 142 and 143 having a width equal to the total width of the disk 130a and the toothed wheel 130b forming a utility gear. The gears 130 are adapted to co-act with the teeth 129 of the zero-setting and aligning tooth 48. Moreover two diametrically opposed teeth 144 and 145, (Fig. 5) of the wheel 130b are of less height than the remaining teeth of the wheel 130b, to coact with the feeling member 146 (Figs. 1 and 4) of the clear sign printing device, rocked by contact of its lower edge 15$^x$ with the beveled end of a pin 14$^x$ projecting vertically from one end of a suitably pivoted horizontally extending lever 13$^x$, as described and illustrated in British Patent No. 414,248. Mounted on the front wall 119 of the calculating mechanism 147, by means of screws 148, is a support 149 shaped as shown in Fig. 4 which at its upwardly bent end, bears a rotatably mounted roller 150 which co-acts with the flanged lower edge of the plate 151 (Figs. 1 and 4) of the totalizer 6 in the manner set forth hereafter under the heading "Operation of the device according to the invention."

*Operation of the device according to the invention*

At first, it may be assumed that values have been introduced into the totalizers 6 in a known manner. Now, if the total or the subtotal is to be taken, the respective totalizer 6 is brought into its working position by means of the space key 11 (Fig. 1) or one of the tabulator keys 12, whereby the left-hand driving wheel 96 of the column totalizer 6 is brought into engagement with the master or driving wheel 63, and the left-hand utility gear wheel 130 of the column totalizer 6 comes into a position opposite the gap or recess 153 (Fig. 5) of the zero-setting and aligning tooth 48. When the totalizer 6 is moved into its working position, the main driving wheels 63 are aligned by the portion 154 of the aligning tooth 48, with the column totalizer 6 in total printing and clearing position, depression of the total key 15 (TV) will rock the key lever 24 so that the latter by means of its arm 155 (Figs. 1 and 2) acts upon the lever 39 and swings it in an anti-clockwise direction round the screw 156. The slide 40 participates in this movement and is displaced in the direction of the arrow 41. The lever 44 (Figs. 1 and 2) is also acted upon thereby and swung round the screw 45 in an anti-clockwise direction, thus acting with the inclined cam face 116 of the extension 46 of the lever 44, upon the roller 117 on the zero-setting and aligning tooth 48. The aligning tooth 48 is thereby upwardly moved in the direction of the arrow 157, against the action of the spring 121. As the key 15 reaches its depressed position, the roll 117 seats itself against the cam face 158 (Fig. 2) of the extension 46. When depressing the key 15 the actuating mechanism is released in the manner described in U. S. patent to Kämmel, No. 2,236,642, and the main driving wheel 63 (Fig. 4) is driven in an anti-clockwise direction. The left-hand driving wheel 96 of the column totalizer 6 is thereby rotated in a clockwise direction and the left-hand utility gear 130 of the column totalizer 6 is rotated in an anti-clockwise direction, for instance, by five units, if the value "5" has heretofore been registered on the left-hand numeral wheel of the totalizer 6, whereby the tooth 143 of the utility gear 130 strikes against the aligning tooth 129 of the arresting member 48 elevated into its orbit, while the toothed rim of the utility gear itself passes through the slot 153 (Fig. 5) of the aligning tooth or arresting member 48. At the same time, by the rotation of the driving wheel 96 in a clock-wise direction, the numeral wheel 87 is set from "5" to "0," by the intermediate wheels 139 and 137, whereby the value which is in the left hand numeral wheel 87 is cleared or brought out of the totalizer 6. This value at the same time is printed on the form or paper by means of the mechanism described and illustrated in Patent No. 2,236,642. In the same manner, the values which are in the remaining numeral wheels 87 are written out. Now, after the last place or denomination of the totalizer 6 has been cleared, the total printing and clearing key 15 which, up to this instant, has been held depressed automatically, as described in Patent No. 2,236,642, is released, whereby all of the mechanisms thereby actuated return to their normal original positions, thus completing the operation.

In consequence of the arrangement of the utility gears 130 in the totalizer 6, it is possible to combine the usual clear sign feeling member 146 (Figs. 1 and 4) also with the group of utility gears. The feeling member 146 which is rotatably mounted on the shaft 160 then feels whichever of the two short teeth 144 or 145 of the utility gears 130 is in its path.

In order to guide the totalizer 6 in a safe and reliable manner as it is shifted to the calculating place or denomination, the following arrangement is provided:

When any of the totalizers 6 is shifted in letter spacing direction to the left-hand calculating place or denomination, the roller 150 (Figs. 1 and 4) of the support 149 contacts with the flange 161 of the plate 151 which is fastened to the totalizer 6 and thus prevents the totalizer 6 from rising. The plate 151 is fastened in the two side walls of the totalizer 6 in a suitable manner and, at the same time, forms the front wall of the totalizer 6.

This guiding device is known per se, from patent to Kurowski, Number 1,876,696, of September 13, 1932, although its use has not been suggested before in connection with the total printing and clearing device and this novel combination adds to the faultless and reliable clearing of the totalizers.

Briefly reviewing the foregoing, it appears that each totalizer wheel 87 (Fig. 5), is driven by its individual gear train, including the toothed gears 137, 139 and 96, together with the utility gear 130 formed of a circumferentially toothed part 130b, and a disk-like part 130a untoothed except for two opposed teeth 142 forming continuations of two of the teeth of the circumferentially toothed part 130b.

Obviously, the teeth of the circumferentially toothed part project radially beyond the untoothed periphery of the disk-like part 130a.

The aligning tooth or arresting member 48 may be recessed or cut away along one side edge, as shown in Fig. 5, to leave an extension 48a adapted to project over and normally rest upon a flange 123 of the grooved guide member 128, (Fig. 3), in which the body of the arresting member is slidably accommodated.

The upper beveled edge or tooth 129 formed on the arresting member 48 is provided with a gap or recess 153 of sufficient width and depth to clear the teeth on the circumferentially toothed part 130b of that utility disk whose intermeshing gear 96 is, at that time, in mesh with the master wheel or driving gear 63 (Fig. 4). The recess 153, however, is not wide enough to allow the broad teeth 142, 143 to clear the arresting member.

Since the arresting member is only brought into use when it is desired to reset the totalizer wheels 87 to zero in clearing, sub-totaling or totaling operations, at which times it is desired to arrest rotation of that train of gears engaged with the master wheel, the aligning tooth 48 is quite effective.

It is obvious, too, that since the arresting member 48 to be effective must permit the rotation of the gear train until the totalizer wheel driven thereby is set at zero, and that since these trains are individually actuated only when engaged with the master wheel 63, the notch, gap or recess 153 must be located at a point in the length of the tooth 129, so that, as the train advances axially to the left to mesh its gear 96 with the master wheel, it shall at the same time advance its utility gear 130 so that the circumferentially toothed part 130b is aligned with the recess 153. Therefore the recess bears a pre-determined relation to the master wheel.

It will be further observed that the normally idle arresting member 48 is projected upwardly to its effective position in a direction radial with respect to the gears.

This necessitates that the beveled or toothed upper edge 129 of the arresting member 48 enter between any two teeth of the differentially rotated axially or utility gears 130.

The entry of the upper edge of the arresting member 48 between the teeth of the utility gears 130 serves to align the gears of the several trains so that the gears 96 will properly intermesh with the teeth of the master wheel 63, as they successively engage therewith. Also this action operates to center the totalizer wheels 87 relatively to the sight aperture.

Furthermore, that portion of the beveled edge of the arresting member 48 to the left of the slot or recess 153 maintains control of the respective gear trains after the totalizer wheels 87 thereof have been reset to zero, the utility gears sliding along the left-hand portion of the tooth 129.

It will also be observed that the extreme upper end of the extension 46 is an angular cam 116, 158. Normally, when the arresting member 48 is in its idle position, the roller stud 117 thereof lies opposite the inclined cam face 116, the extension 46 being shown in dotted lines, in its idle position. Upon depression of the key 15, the extension 46 rocks counter-clockwise, to press the inclined cam face 116 against the roller stud 117 and slide the arresting member 48 upwardly to its effective elevated position.

The angle of the cam face 158 is such that as the extension 46 is rocked counter-clockwise, the cam face 158 approaches the horizontal, so that as the key 15 reaches its completely depressed position, the cam face 116 leaves the stud, and is succeeded by the cam face 158 which by this time is substantially horizontal and supports the arresting member in its fully elevated position.

I claim:

1. In a typewriting calculating machine, a main driving wheel, a total taking key for initiating total taking operations, an aligning tooth, a totalizer comprising numeral wheels, a train of toothed wheels for transmitting the driving motion from the main driving wheel to the numeral wheels in combination, and an additional group of toothed wheels connected in parallel with the said train of toothed wheels and having zero setting teeth at each of its toothed wheels, said zero setting teeth being adapted to coact with said aligning tooth.

2. In a typewriting accounting machine, the combination with a master wheel; and a totalizer having denominational totalizer wheels, the totalizer and master wheel adapted for relative axial travel; of a group of gears individual to each totalizer wheel, the groups of gears being successively engageable with the master wheel; a combined aligning and arresting member for the totalizer normally ineffective relatively to a corresponding circumferentially toothed gear in each group of gears; means to shift the aligning and arresting member into the path of axial movement of the denominational groups of gears, whereby the spaces between teeth of corresponding gears of each group engage over and travel along one edge of the aligning and arresting member during their axial movement; said edge of the member intermediate its ends being recessed to form a clearance for the circumferential teeth of said corresponding gears as the gears are successively stepped axially into engagement with the master wheel; and projections located on said gears to contact the aligning and arresting member in the rotation of each corresponding gear by the master wheel, to arrest the associated totalizer wheel.

3. In a typewriting accounting machine, the combination with a master wheel; and a totalizer having denominational wheels; of a master wheel-driven gear associated with each totalizer wheel; a normally idle aligning and arresting member shiftable into effective relation with said master wheel-driven gears to align the gears prior to their operation by the master wheel, and recessed intermediate its sides to enable rotation of said gears only when engaged with the master wheel; and a projection on each gear adapted to contact the arresting member during rotation of the gear by the master wheel, to arrest the corresponding totalizer wheel in its zero position incident to a clearing operation of the totalizer.

4. In a typewriting accounting machine, the combination with a master wheel; and a totalizer having denominational wheels; of a master wheel-driven gear associated with each totalizer wheel; a flanged support; an arresting member slidably mounted between the flanges of the support, and having an edge adapted to enter between the teeth of the several master wheel-driven gears to center the latter; one wall of the support being grooved; a spring normally retaining the arresting member at one limit of its travel; an abutment on the arresting member in line with the groove in the support; means operable upon the abutment to shift the arresting member to its opposite position; the abutment adapted to pass through the groove in the support upon removal of the arresting member.

5. In a typewriting-accounting machine, the combination with a master wheel; a total key to initiate total-taking operations; a travelling carriage; and a totalizer mounted to travel with the carriage step-by-step into and out of engagement with the master wheel, the totalizer including denominational numeral wheels, and denominational groups of gears individual to the respective numeral wheels, and successively engageable, from highest to lowest orders, with the master wheel; of combined means to align the denominational groups of gears and totalizer numeral wheels as they successively approach the master wheel, and to arrest the numeral wheels in their zero positions, and to maintain the numeral wheels in their zero positions after escaping the master wheel, including a normally ineffective arresting and aligning member; means operable by the total key to project the arresting and aligning member into the path of travel of one of the gears of each denominational group; a zero-setting tooth on each of the gears with which the arresting and aligning member meshes; the meshing edge of the arresting and aligning member having a transversely extending notch intermediate its ends, of sufficient width and depth to accommodate all the teeth of said individual gear, except the zero-setting tooth, to enable rotation of the individual gear bearing the zero-setting tooth, until the zero-setting tooth contacts the arresting and aligning member to arrest the associated totalizer wheel at zero; the meshing edge of the arresting and aligning member to the right of the notch being effective to align the denominational groups of gears and their numeral wheels as they advance successively into register with the master wheel and the notch, for rotation by the master wheel.

6. In a typewriting-accounting machine, the combination with a master wheel; a total key to initiate total-taking operations; a travelling carriage; and a totalizer mounted to travel with the carriage step-by-step into and out of engagement with the master wheel, the totalizer including denominational numeral wheels, and denominational groups of gears individual to the respective numeral wheels, and successively engageable, from highest to lowest orders, with the master wheel; of combined means to align the denominational groups of gears and totalizer numeral wheels as they successively approach the master wheel, and to arrest the numeral wheels in their zero positions, and to maintain the numeral wheels in their zero positions after escaping the master wheel, including a normally ineffective arresting and aligning member; means operable by the total key to project the arresting and aligning member into the path of travel of one of the gears of each denominational group; including a lever, the upper free end of which is obtusely angled, and a projection on the aligning member normally lying in the path of one angular edge of the lever end, to cam the aligning and arresting member to effective position upon operation of the lever, which results in shifting the remaining angular edge of the lever end to the horizontal position, to sustain the aligning and arresting member in its effective position; a zero-setting tooth on each of the gears with which the arresting and aligning member meshes; the meshing edge of the arresting and aligning member having a transversely extending notch intermediate its ends, of sufficient width and depth to accommodate all the teeth of said individual gear, except the zero-setting tooth, to enable rotation of the individual gear bearing the zero-setting tooth, until the zero-setting tooth contacts the arresting and aligning member to arrest the associated totalizer wheel at zero; the meshing edge of the arresting and aligning member to the right of the notch being effective to align the denominational groups of gears and their numeral wheels as they advance successively into register with the master wheel and the notch, for rotation by the master wheel.

7. In a typewriting-accounting machine, having a travelling carriage; the combination with a master wheel; a totalizer mounted to travel with the carriage, including a series of denominational wheels, and a group of gears individual to and associated with each denominational wheel, and advanced axially step by step into and out of mesh with the master wheel; one corresponding gear of each group having a zero-setting tooth; of a normally idle arresting member shiftable into and out of effective position; means to mesh one edge of said member between two teeth of each of the corresponding gears bearing the zero-setting teeth; said meshing edge having a breadth sufficient to engage between the teeth of two or more gears simultaneously and having a transversely extending notch formed therethrough intermediate the sides of the member, and in predetermined relation to the master wheel, said notch being of a width and depth sufficient to accommodate the normal teeth only of said corresponding gears, to enable the arresting member to form an abutment against which the zero tooth strikes to arrest the active totalizer wheels one by one in their zero positions as they are successively acted upon by the master wheel during a total-taking operation.

ROBERT ANSCHÜTZ.